(12) United States Patent
Wang et al.

(10) Patent No.: US 9,922,648 B2
(45) Date of Patent: Mar. 20, 2018

(54) DEVELOPER VOICE ACTIONS SYSTEM

(71) Applicant: Google Inc., Mountain View, CA (US)

(72) Inventors: Bo Wang, San Jose, CA (US); Sunil Vemuri, Pleasanton, CA (US); Barnaby John James, Los Gatos, CA (US); Scott B. Huffman, Portola Valley, CA (US); Pravir Kumar Gupta, Los Altos, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/057,453

(22) Filed: Mar. 1, 2016

(65) Prior Publication Data

US 2017/0256256 A1 Sep. 7, 2017

(51) Int. Cl.
G10L 21/00 (2013.01)
G10L 25/00 (2013.01)
(Continued)

(52) U.S. Cl.
CPC ............ G10L 15/22 (2013.01); G10L 15/265 (2013.01); *G10L 2015/223* (2013.01); *G10L 2015/227* (2013.01); *G10L 2015/228* (2013.01)

(58) Field of Classification Search
CPC ... G10L 15/22; G10L 15/00; G10L 2015/228; G10L 2015/088; G06F 3/048; G06F 3/167; G06F 2209/545
See application file for complete search history.

(56) References Cited

U.S. PATENT DOCUMENTS 5,632,002 A * 5/1997 Hashimoto ............. G06F 3/165
704/231
5,732,395 A 3/1998 Silverman
(Continued)

FOREIGN PATENT DOCUMENTS

EP 0984354 A2 3/2000
WO 2017/151215 A1 9/2017

OTHER PUBLICATIONS

Bulyko et al. "Web Resources for Language Modeling in Conversational Speech Recognition," ACM Trans. on Speech and Language Processing, Dec. 2007, 25 pages.
(Continued)

*Primary Examiner* — Michael Ortiz Sanchez
(74) *Attorney, Agent, or Firm* — Brake Hughes Bellermann LLP

(57) ABSTRACT

Methods, systems, and apparatus for receiving, by a voice action system, data specifying a new voice action for an application different from the voice action system. A voice action intent for the application is generated based at least on the data, wherein the voice action intent comprises data that, when received by the application, requests that the application perform one or more operations specified for the new voice action. The voice action intent is associated with trigger terms specified for the new voice action. The voice action system is configured to receive an indication of a user utterance obtained by a device having the application installed, and determines that a transcription of the user utterance corresponds to the trigger terms associated with the voice action intent. In response to the determination, the voice action system provides the voice action intent to the device.

21 Claims, 4 Drawing Sheets

(51) Int. Cl.
   *G10L 15/22* (2006.01)
   *G10L 15/26* (2006.01)

(56) References Cited

U.S. PATENT DOCUMENTS

| | | | |
|---|---|---|---|
| 5,748,191 A | 5/1998 | Rozak et al. | |
| 6,125,347 A * | 9/2000 | Cote | G10L 15/26 704/270 |
| 6,192,343 B1 * | 2/2001 | Morgan | G06F 9/4446 704/231 |
| 6,363,348 B1 | 3/2002 | Besling et al. | |
| 6,374,226 B1 * | 4/2002 | Hunt | G10L 15/26 704/255 |
| 6,424,357 B1 | 7/2002 | Frulla et al. | |
| 6,442,522 B1 * | 8/2002 | Carberry | G10L 15/1822 704/257 |
| 6,615,177 B1 * | 9/2003 | Rapp | G10L 15/26 704/270 |
| 6,748,361 B1 | 6/2004 | Comerford et al. | |
| 7,013,282 B2 | 3/2006 | Schroeter | |
| 7,167,831 B2 * | 1/2007 | Falcon | G10L 15/30 704/275 |
| 7,363,228 B2 | 4/2008 | Wyss et al. | |
| 7,412,391 B2 | 8/2008 | Nakagawa et al. | |
| 7,877,258 B1 | 1/2011 | Chelba et al. | |
| 7,881,932 B2 * | 2/2011 | Muschett | G06F 17/2247 704/244 |
| 7,899,673 B2 * | 3/2011 | Brown | 704/10 |
| 8,165,886 B1 | 4/2012 | Gagnon et al. | |
| 8,219,407 B1 * | 7/2012 | Roy | G10L 15/22 704/255 |
| 8,239,206 B1 | 8/2012 | LeBeau et al. | |
| 8,301,448 B2 * | 10/2012 | Carus | G10L 15/183 704/251 |
| 8,370,146 B1 | 2/2013 | Schalkwyk et al. | |
| 8,532,675 B1 | 9/2013 | Pasquero et al. | |
| 8,626,511 B2 * | 1/2014 | LeBeau | G10L 15/30 379/45 |
| 8,682,661 B1 | 3/2014 | Schalkwyk et al. | |
| 8,731,939 B1 | 5/2014 | LeBeau et al. | |
| 8,965,759 B2 | 2/2015 | Hershenhorn | |
| 2002/0133354 A1 * | 9/2002 | Ross | G10L 15/30 704/275 |
| 2003/0236664 A1 | 12/2003 | Sharma | |
| 2004/0260562 A1 * | 12/2004 | Kujirai | G01C 21/3608 704/275 |
| 2006/0106614 A1 * | 5/2006 | Mowatt | G06F 3/167 704/275 |
| 2006/0136221 A1 | 6/2006 | James et al. | |
| 2007/0050191 A1 | 3/2007 | Weider et al. | |
| 2007/0094033 A1 | 4/2007 | Nagashima et al. | |
| 2007/0100636 A1 | 5/2007 | Hirota et al. | |
| 2008/0114604 A1 | 5/2008 | Wei et al. | |
| 2008/0133244 A1 * | 6/2008 | Bodin | G10L 15/22 704/275 |
| 2008/0208585 A1 | 8/2008 | Ativanichayaphong et al. | |
| 2008/0249779 A1 * | 10/2008 | Hennecke | G10L 15/22 704/270 |
| 2008/0270135 A1 | 10/2008 | Goel et al. | |
| 2009/0030691 A1 * | 1/2009 | Cerra | G10L 15/30 704/255 |
| 2009/0171659 A1 | 7/2009 | Pearce et al. | |
| 2009/0171663 A1 | 7/2009 | Badt et al. | |
| 2009/0171664 A1 * | 7/2009 | Kennewick | G10L 15/22 704/257 |
| 2009/0216538 A1 | 8/2009 | Weinberg et al. | |
| 2010/0223060 A1 | 9/2010 | Chang et al. | |
| 2010/0286985 A1 | 11/2010 | Kennewick et al. | |
| 2010/0312547 A1 | 12/2010 | Van Os et al. | |
| 2010/0312782 A1 | 12/2010 | Li et al. | |
| 2011/0106534 A1 | 5/2011 | LeBeau et al. | |
| 2011/0131045 A1 * | 6/2011 | Cristo | G06F 17/279 704/249 |
| 2011/0144980 A1 | 6/2011 | Rysenga | |
| 2011/0196668 A1 | 8/2011 | Shu et al. | |
| 2012/0078635 A1 | 3/2012 | Rothkopf et al. | |
| 2012/0173244 A1 | 7/2012 | Kwak et al. | |
| 2012/0316871 A1 | 12/2012 | Koll et al. | |
| 2012/0323557 A1 | 12/2012 | Koll et al. | |
| 2013/0219277 A1 * | 8/2013 | Wang | G06F 3/167 715/728 |
| 2013/0238326 A1 | 9/2013 | Kim et al. | |
| 2013/0246050 A1 | 9/2013 | Yu et al. | |
| 2013/0317823 A1 | 11/2013 | Mengibar et al. | |
| 2014/0082501 A1 | 3/2014 | Bae et al. | |
| 2014/0195243 A1 | 7/2014 | Cha et al. | |
| 2014/0244271 A1 | 8/2014 | Lindahl | |
| 2014/0279233 A1 | 9/2014 | Lau et al. | |
| 2014/0343950 A1 | 11/2014 | Simpson et al. | |
| 2015/0019074 A1 | 1/2015 | Winter et al. | |
| 2015/0089373 A1 * | 3/2015 | Dwivedi | G06F 3/167 715/728 |
| 2015/0124944 A1 | 5/2015 | Perotti et al. | |
| 2015/0254058 A1 | 9/2015 | Klein et al. | |
| 2015/0379981 A1 | 12/2015 | Balasubramanian et al. | |
| 2016/0042748 A1 | 2/2016 | Jain et al. | |

OTHER PUBLICATIONS

LumenVox, "Grammars," retrieved on Jul. 31, 2010, http://www.lumenvox.com/pdf/grammars.pdf, 9 pages.

Taylor, P.A. "Concept-to-Speech Synthesis by Phonological Structure Matching." Center for Speech Technology Research, University of Edinburgh; The Royal Society, 2000, 14 pages.

Office Action for GB Application No. 1621570.9, dated May 30, 2017, 10 pages.

International Search Report and Written Opinion for PCT Patent Application No. PCT/US2016/068507, dated Feb. 21, 2017, 12 pages.

* cited by examiner

DEVELOPER VOICE ACTIONS SYSTEM

TECHNICAL FIELD

This specification relates to voice actions, and one particular implementation relates to configuring voice actions.

BACKGROUND

A task in an application can include one or more activities defined in software that a user interacts with to perform a certain job. The activity is a class that controls the life cycle of the execution of the task, such the multiple activities exercised within the task can permit the user to perform the job. In some implementations, a command can be associated with an activity or an action related to an activity, such that a user submission of the command can trigger the activity or action. A specific intent can be fired to trigger the starting of the activity or performance of the action.

SUMMARY

This specification describes a platform that allows an application developer to deploy new voice actions for previously installed software applications. In general, using the platform, the application developer can submit information defining the new voice action, where the information specifies the application, an action that the new voice action is directed to triggering, a trigger term for triggering the action, and a context in which the trigger term should be effective to trigger the action in the application.

The context submitted by the application developer can specify a user device status when the voice action should be effective to trigger the action in the application. A device status can include, for example, which application(s) is operating in the foreground (i.e., currently active in a user interface of the device) or in the background (i.e., currently hidden from view in the user interface of the device), or can include specific information about applications, such as what activities they are currently running, the status of running activities, and so on.

When the application developer submits information defining the new voice action, the service or tool can validate the information defining the new voice action to determine whether the new voice action is compatible with the application, or to otherwise determine whether the new voice action can be implemented. If the new voice action is valid, a new instance of a passive data structure called an intent and having a specific format can be created for the voice action by inducting the information defining the new voice action. The intent can specify some or all of the information defining the new voice action, such as the application, the trigger term, the activity or action to be triggered in response to detecting the trigger term, and context that is necessary for the trigger term to be trigger the activity or action. The voice action can then be deployed for the application, such that the voice action becomes an enabled voice action for the application without additional alterations being made to the application code to support the voice action.

Once the voice action has been deployed, a user operating a user device can provide a speech input. The user device can submit context information for the user device, and the context information and a transcription of the speech input can be used to identify an intent and to trigger the identified intent. When the intent is triggered, data for executing the activity or action is determined, and is transmitted to the user device to execute the activity or action in response to the voice input.

For example, an application developer of a media player application can define a new voice action for skipping to a next song that uses the trigger term "play next." The application developer can specify a context when the "play next" voice action should be enabled. For example, the application developer may specify that the "play next" voice action should only cause the media player application to skip to the next song when the media player application is running in the foreground and is in a mode that causes the media player application to operate as an audio player. After the voice action has been deployed by the application developer, a user having the media player application previously installed on their user device might submit the voice input "play next." The user device can submit context information indicating a status of the user device or of applications installed on the user device, such as context information indicating that the media player application is running in the foreground and is in audio player mode. In response to receiving the voice input "play next" and the information specifying the context, data can be transmitted to the user device that causes the media player application to skip to a next song. In contrast, if the voice input is determined to say "play next" but the context information indicates that a social networking application is running in the foreground of the user device instead of the media player application, then the "play next" voice input may not have any effect, or may cause a different operation to be performed at the user device.

Innovative aspects of the subject matter described in this specification may be embodied in methods that include the actions of receiving, by a voice action system, data specifying a new voice action for a software application different from said voice action system, the data comprising one or more operations for performing the new voice action and one or more trigger terms for triggering the new voice action, generating, by the voice action system, a contextual voice action intent for the software application based at least on the received data, wherein the contextual voice action intent comprises data that, when received by the software application, requests that the software application perform the one or more operations of the new voice action, associating, by the voice action system, the contextual voice action intent with the one or more trigger terms for the new voice action, wherein the voice action system is configured to: receive an indication of a user utterance obtained by a device having the software application installed, determine that a transcription of the user utterance corresponds to the one or more trigger terms associated with the contextual voice action intent, and in response to the determination, provide, to the device, the contextual voice action intent, thereby requesting that the software application installed on the device perform the one or more operations of the new voice action.

These and other embodiments may each optionally include one or more of the following features. In various examples, the received data specifies a context, the context specifying a status of a device or of the software application when the new voice action is enabled; the context specifies that the software application is operating in the foreground of a device on which the software application is installed; the context specifies that the software application is operating in the background of a device on which the software application is installed; the context specifies that the software application is performing a specific activity; the context specifies that a specific activity that the software application is performing is in a particular activity state.

In other examples, these and other embodiments may each optionally include features comprising: associating the contextual voice action intent with the context for the new voice action, receiving, by the voice action system, context information indicating a status of a particular device having the software application installed or of the software application installed on the particular device, determining that the context information satisfies the context for the new voice action, and in response to determining that a transcription of a user utterance obtained by the particular device corresponds to the one or more trigger terms associated with the contextual voice action intent and that the context information satisfies the context associated with the contextual voice action intent, providing, by the voice action system to the particular device, the contextual voice action intent, thereby requesting that the software application installed on the particular device perform the one or more operations of the new voice action; receiving the context information indicating the status of the particular device or of the software application installed on the particular device comprises: providing, by the voice action system to the particular device, a request for particular context information, and receiving the particular context information in response to the request In still other examples, these and other embodiments may each include one or more features comprising: determining that the context information satisfies a context for a second voice action, and that the transcription of the user utterance corresponds to the one or more trigger terms that are associated with an intent for the second voice action, where the intent for the second voice action specifies one or more operations for performing the second voice action, in response to the determination, selecting a voice action from among the new voice action and the second voice action, and providing, by the voice action system to the particular device, the intent associated with the selected voice action, thereby requesting that the software application installed on the particular device perform the one or more operations of the selected voice action; selecting the selected voice action from among the new voice action and the second voice action comprises selecting the selected voice action in response to receiving data indicating a user selection of one of the new voice action or the second voice action; selecting the selected voice action from among the new voice action and the second voice action comprises: assigning a score to each of the new voice action and the second voice action, and selecting the selected voice action based at least on the score assigned to each of the new voice action and the second voice action; selecting the selected voice action from among the new voice action and the second voice action comprises selecting the selected voice action in response to determining that the software application associated with the selected voice action is operating in the foreground.

In other examples, these and other embodiments may each include one or more features including: generating the contextual voice action intent for the software application comprises determining that the one or more operations of the new voice action are capable of being performed by the software application; determining that a transcription of a user utterance obtained by a particular device having the software application installed is similar to the one or more trigger terms associated with the contextual voice action intent, in response to the determination, providing, by the voice action system to the particular device, data indicating a request for user input that confirms whether the user utterance specified the one or more trigger terms or was intended to cause the software application to perform the new voice action, in response to the request, receiving, by the voice action system and from the particular device, data indicating a confirmation, and in response to receiving the data indicating the confirmation, providing, by the voice action system to the particular device, the contextual voice action intent, thereby requesting that the software application installed on the particular device perform the one or more operations of the new voice action.

In other examples, these and other embodiments may each include one or more features comprising: receiving, by the voice action system from a developer associated with the software application, a request to deploy the new voice action for the software application, and in response to the request, deploying the new voice action for the software application in response to the request, wherein deploying the new voice action for the software application enables the new voice action for the software application; receiving, by the voice action system from a developer associated with the software application, a request to rescind deployment of the new voice action for the software application, and in response to the request, rescinding deployment of the new voice action for the software application in response to the request, wherein rescinding deploying of the new voice action for the software application disables the new voice action for the software application.

In other examples, these and other embodiments may each include one or more features comprising: receiving, by the voice action system from a developer associated with the software application, a request to enable testing of the new voice action, wherein the request specifies one or more devices for which the new voice action should be enabled, and in response to the request, enabling the new voice action for the one or more specified devices, wherein the new voice action is disabled for devices that are not included in the specified devices; receiving, by the voice action system, an indication of a user utterance obtained by a particular device having the software application installed, determining, by the voice action system, that a transcription of the user utterance corresponds to the one or more trigger terms associated with the contextual voice action intent, and in response to the determination, providing, by the voice action system to the particular device, the contextual voice action intent, thereby requesting that the software application installed on the particular device perform the one or more operations of the new voice action.

The details of one or more embodiments of the subject matter described in this specification are set forth in the accompanying drawings and the description below. Other potential features, aspects, and advantages of the subject matter will become apparent from the description, the drawings, and the claims.

DETAILED DESCRIPTION

Figure 1:
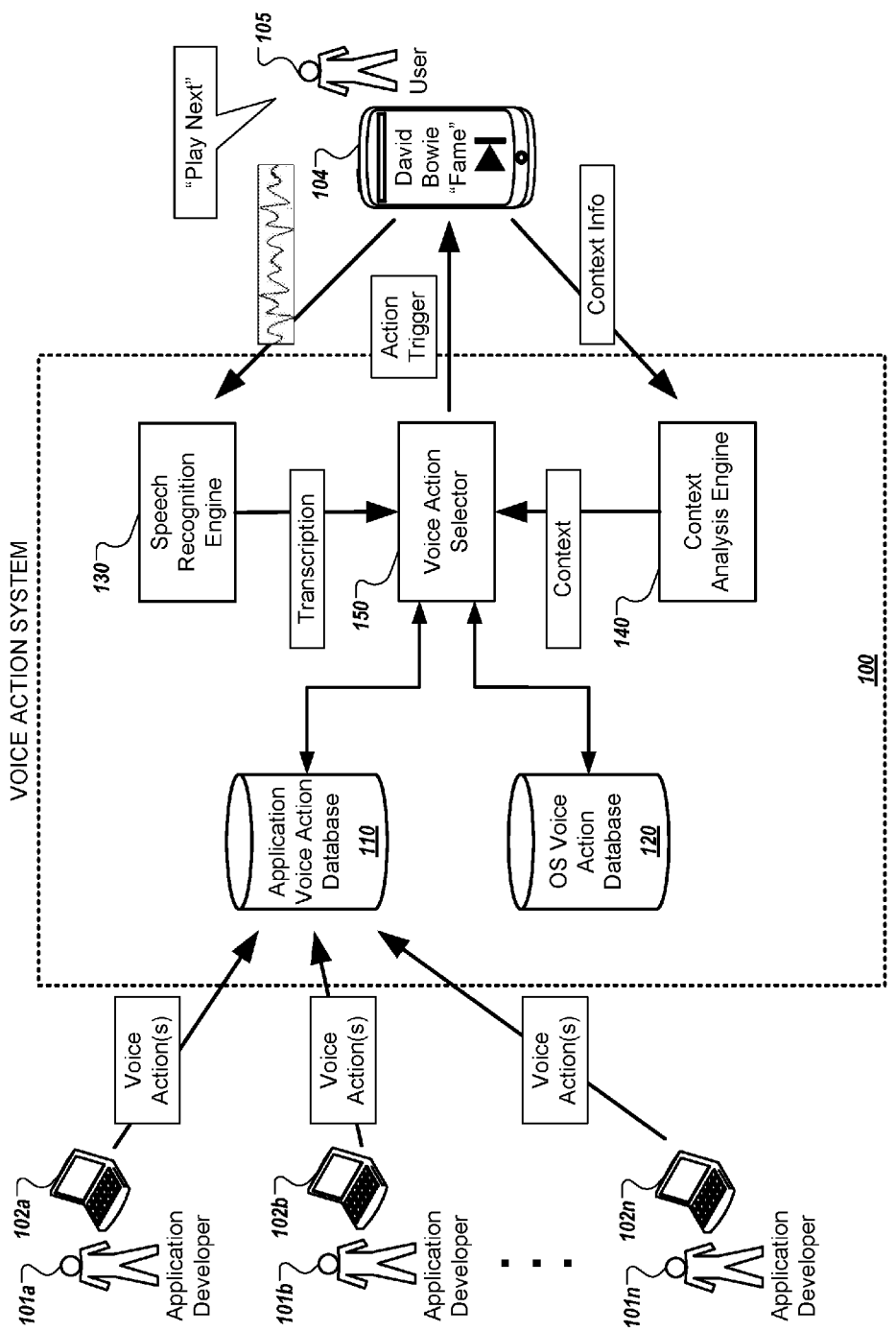
FIG. 1 depicts an example system for a voice action development system and service.

FIG. 1 illustrates an example of a voice action system 100. The voice action system 100 provides a platform and service whereby an application developer can establish new voice actions for an application that has previously been installed on other users' devices. Thereafter, users of the application having the application installed on their devices can use voice commands in order to cause the application to perform a specific operation as specified by the new voice action.

The voice action system 100 receives from terminals 102a-102n data defining new voice actions submitted by application developers 101a-101n, wherein the new voice actions are for one or more different applications. The voice action system 100 can determine whether each new voice action is a valid voice action. Each new voice action that is determined to be valid can be inducted to generate an intent corresponding to the new voice action, and the intent corresponding to the new voice action can be stored at an application voice action database 110 of the voice action system 100.

For example, the voice action system 100 may have a validation engine that receives and validates the data defining the new voice action. Validating the data may include determining that the formatting of the data defining the voice action complies with requirements, determining that the new voice action is compatible with the specified application, or otherwise determining that a voice action can be established based on the data received from the application developer 101a-101n. An indication engine of the voice action system 100 can receive the validated data defining the new voice action, and can induct the data to generate the intent corresponding to the new voice action. The intent can then be stored in the application voice action database 110.

The application voice action database 110 can store voice actions that pertain to activities or actions that can be performed within numerous different software applications. The voice actions included in the application voice action database 110 may include built-in voice actions that were submitted by application developers 101a-101n when the application was built, as well as voice actions that were submitted by application developers 101a-101n after the application was built for operations supported by the application.

The voice actions can also include application-specific voice actions that are supported by default by the operating system. These pre-supported voice actions may be voice actions that are capable of being implemented in applications without having to be submitted to the voice action system 100 by an application developer 101a-101n. For example, the voice action "exit application" to exit a task or activity running in the foreground may be automatically available for any application, and may be included in the application voice action database 110 for each application, without an application developer 101a-101n having to submit information to the voice action system 100 to define the "exit application" voice action.

In addition to the application voice action database 110, the voice action system 100 can include an operating system (OS) voice action database 120 that stores voice actions that are not associated with any particular application or context. For example, a voice action "lock phone" that causes a device to enter a locked state may be a voice action that is specified in the OS voice action database 120 as a voice action that is not associated with a particular application, or that is universally accessible, i.e., regardless of a device's status when the "lock device" voice action is detected. Generally, the voice actions stored in the OS voice action database 120 are voice actions that are not generated based on application developers 101a-101n defining the voice actions, since the voice actions stored at the OS voice action database 120 are generic to a user device operating environment and not any particular application generated by third party application developers 101a-101n.

The voice action system 100 enables a user 105 having a user device 104 to provide spoken voice input to their user device 104 to cause actions to be performed by the user device 104 or applications operating on their user device 104. For example the user 105 having the user device 104 has a media player application running on their user device 104 and provides the spoken input "play next" while the media player application is running in the foreground of the user device 104.

Audio data corresponding to the spoken input and context information specifying a status of the user device 104, including the status of applications running on the user device 104, is transmitted to the voice action system 100. Specifically, for the example shown in FIG. 1, the audio data corresponding to the voice input "play next" is received by a speech recognition engine 130 of the voice action system 100, and the context information indicating the status of the user device 104 is received by a context analysis engine 140 of the voice action system 100. The context information may indicate that the media player application is running in the foreground of the user device 104, that the media player application is currently in an audio player mode, and may indicate other information about the status of the user device 104 and applications installed on the user device 104.

The speech recognition engine 130 receives the audio data corresponding to the voice input, generates a transcription of the voice input, and provides the transcription of the voice input to the voice action selector 150. The context analysis engine 140 receives the context information from the user device 104 and processes the context information to determine relevant context information. For example, the context analysis engine 140 may analyze the context information to identify applications that are installed on the user device 104, and metadata associated with each of those applications may specify available voice actions for the application and context information that is relevant to determining which of the voice actions might be enabled for a given device status. In some instances, based on the analysis, the context analysis engine 140 may determine that additional context information is required to identify which voice actions should be enabled for a particular status of the user device 104, and so the context analysis engine 140 may request additional context information from the user device 104. The context analysis engine 140 forwards the processed context information to the voice action selector 150.

For example, as shown in FIG. 1, the speech recognition engine 130 may receive the audio data corresponding to the voice input "play next" and may obtain a transcription of the voice input. The context analysis engine 140 receives context information from the user device 104 that specifies that the media player application is running in the foreground, that the media player application is operating in an audio player mode, and that specifies other information about the user device 104. For instance, the context information may also indicate that a social network application is operating in the background of the user device 104 and that the battery life of the user device 104 is currently 50%. The context analysis engine 150 may receive information indicating that the user device 104 has both the media player and social network applications installed and may determine that neither the media player application nor the social network application enables voice actions based on context information that indicates a device battery life. Therefore, the context analysis engine 140 may filter the context information to indicate only that the media player application is operating in the foreground of the user device 104, that the media player application is in an audio player mode, and that the social network application is operating in the background of the user device 104. The filtered context information and the transcription of the voice input "play next" may then be provided to the voice action selector 150.

The voice action selector 150 receives the transcription of the spoken input from the speech recognition engine 130 and a context from the context analysis engine 140 that includes processed context information. The voice action selector 150 uses the transcription and the context to identify a particular intent associated with a particular voice action to trigger at the user device 104. For example, the voice action selector 150 can access the application voice action database 110 and the OS voice action database 120 to identify a set of candidate voice actions that are enabled for the present context of the user device 104. Identifying the set of candidate voice actions can include identifying a set of intents stored at the application voice action database 110 or the OS voice action database 120 that specify contexts matching the context received by the voice action selector 150.

Having identified the set of candidate voice actions that are enabled for the presented context, the voice action selector 150 can compare the transcription of the voice input to one or more trigger phrases associated with each of the enabled voice actions. In general, a trigger phrase can include one or more trigger terms, and operates as an identifier for a voice action, such that detection of the one or more terms of a particular trigger phrase results in identification and triggering of the voice action corresponding to the particular trigger phrase. For instance, the voice action selector 150 can compare the transcription to respective trigger phrases associated with the intents of the enabled voice actions. The voice action selector 150 identifies a particular intent for a particular voice action based on determining that the transcription matches a trigger term specified by the intent associated with the particular voice action.

For example, the voice action selector 150 can receive the transcription of the voice input "play next" and the context for the user device 104, and can use the received context to identify candidate voice actions to initiate at the user device 104, i.e., voice actions that can be initiated at the user device 104 based on the current status of the user device 104. After determining the set of candidate voice actions for the context of the user device 104, the voice action selector 150 compares the transcription of the voice input "play next" to trigger phrases specified by the intents of the candidate voice actions. The voice action selector 150 can determine that the transcription "play next" matches the trigger phrase specified by the intent of the "play next" voice action for the media player application.

A transcription is identified as matching a trigger phrase based on determining that at least a portion of the transcription matches one or more terms of the trigger phrase. For example, a match between a transcription and a trigger phrase may be identified based on each of the terms of the transcription matching each of the terms of the trigger phrase. In some implementations, a match may be identified based on determining that less than all of the terms of the transcription match terms of the trigger phrase. For example, a transcription may match a trigger phrase even if some of the terms of the trigger phrase are absent from the transcription, if the transcription includes terms in addition to those of the trigger phrase, or if one or more terms of the transcription are different from terms of the trigger phrase. Thus, each of the transcriptions "new email," "send new email," or "open up new email" may be identified as matching the trigger phrase "open new email," despite not each of the transcriptions failing to precisely match the trigger phrase. In some instances, a transcription may be identified as matching a trigger phrase if the transcription includes some or all of the terms of the trigger phrase in a different order than the order specified by the trigger phrase. For example, the transcription "lock phone" may be identified as matching a "phone lock" trigger phrase. In some instances, a transcription may be identified as matching a trigger phrase based on determining that the transcription includes one or more synonyms or alternate terms for terms of the trigger phrase. Thus, the transcriptions "draft new email" or "open new email" may be identified as matching the trigger phrase "write new email" based on "draft" being a synonym of "write," and "open" being an identified alternate term for "write."

Having identified the particular voice action, the voice action selector 150 provides action trigger data to the user device 104 that causes the activity or action associated with the particular voice action to be initiated. To do so, the voice action selector 150 can obtain information for controlling the user device 104 to perform the action or activity associated with the selected voice action. In some instances, controlling the user device 104 to perform the action or activity associated with the selected voice action can include firing an intent of the selected voice action. Firing the intent of the selected voice action may cause information for initiating the activity or action associated with the selected voice action to be provided to the user device 104.

For example, the intent for the selected voice action can include data that causes actions or activities associated with the voice action to be performed by the application associated with the voice action. The selected intent can be transmitted to the user device 104, such that receipt of the intent by the user device 104 can act as a request or can trigger performance of the actions or activities associated with the voice action. Alternatively, the voice action selector 150 can determine other data to operate as action trigger data that causes the selected voice action to be performed at the user device 104, and can transmit the information to the user device 104. For example, an intent may only identify the actions or activities to be performed by the user device 104 to perform the voice action, and the voice action selector 150 can determine action trigger data that can control the application on the user device 104 to perform the actions or activities associated with the voice action. The determined action trigger data can be transmitted to the user device 104 such that the action trigger data causes the actions or activities associated with the voice action to be performed.

For instance, after selecting the "play next" voice action from among the set of candidate voice actions, the voice action selector 150 transmits the intent for the "play next" voice action to the user device 104, or obtains other information for controlling the media player application running on the user device 104 to skip to a next song. The voice action selector 150 transmits the data for controlling the media player application to skip to a next song to the user device 104, which in turn initiates a process for the media player application running on the user device 104 to skip to a next song, for example, to skip ahead to the song "Fame" by David Bowie.

Briefly, as discussed, the system of FIG. 1 includes one or more terminals 102a-102n corresponding to one or more application developers 101a-101n. The terminals 102a-102n can each be in communication with the voice action system 100, for example, over one or more wired or wireless networks. Each of the terminals 102a-102n can be a mobile device, such as a cellular phone, smartphone, tablet computer, laptop computer, personal digital assistant (PDA), netbook computer, or other mobile computing device, or may be any stationary computing device, such as a desktop computer or other stationary computer. A user device 104 associated with a user 105 can also be in communication with the voice action system 100 over one or more wired or wireless networks, where the user device 104 may also be a mobile or stationary computing device, such as a cellular phone, smartphone, tablet computer, netbook, personal digital assistant, laptop computer, desktop computer, or other computing device.

The example voice action system 100 shown in FIG. 1 includes an application voice action database 110, operating system (OS) voice action database 120, speech recognition engine 130, context analysis engine 140, and voice action selector 150. Each of the components of the voice action system 100, including the application voice action database 110, OS voice action database 120, speech recognition engine 130, context analysis engine 140, and voice action selector 150, may be in communication with one or more other components of the voice action system 100 over one or more wired or wireless data pathways that enable that exchange of electronic communications. In some implementations, one or more of the components of the voice action system 100 may be combined such that their functions are performed by a single component, or may be represented by two or more components such that their functions are dispersed across the two or more components. The components of the voice action system 100 may be implemented on a single computing device, such as a single server system, or may be implemented on multiple computing devices that are in communication over one or more wired or wireless data pathways that enable the exchange of electronic communications between the components.

Figure 2:
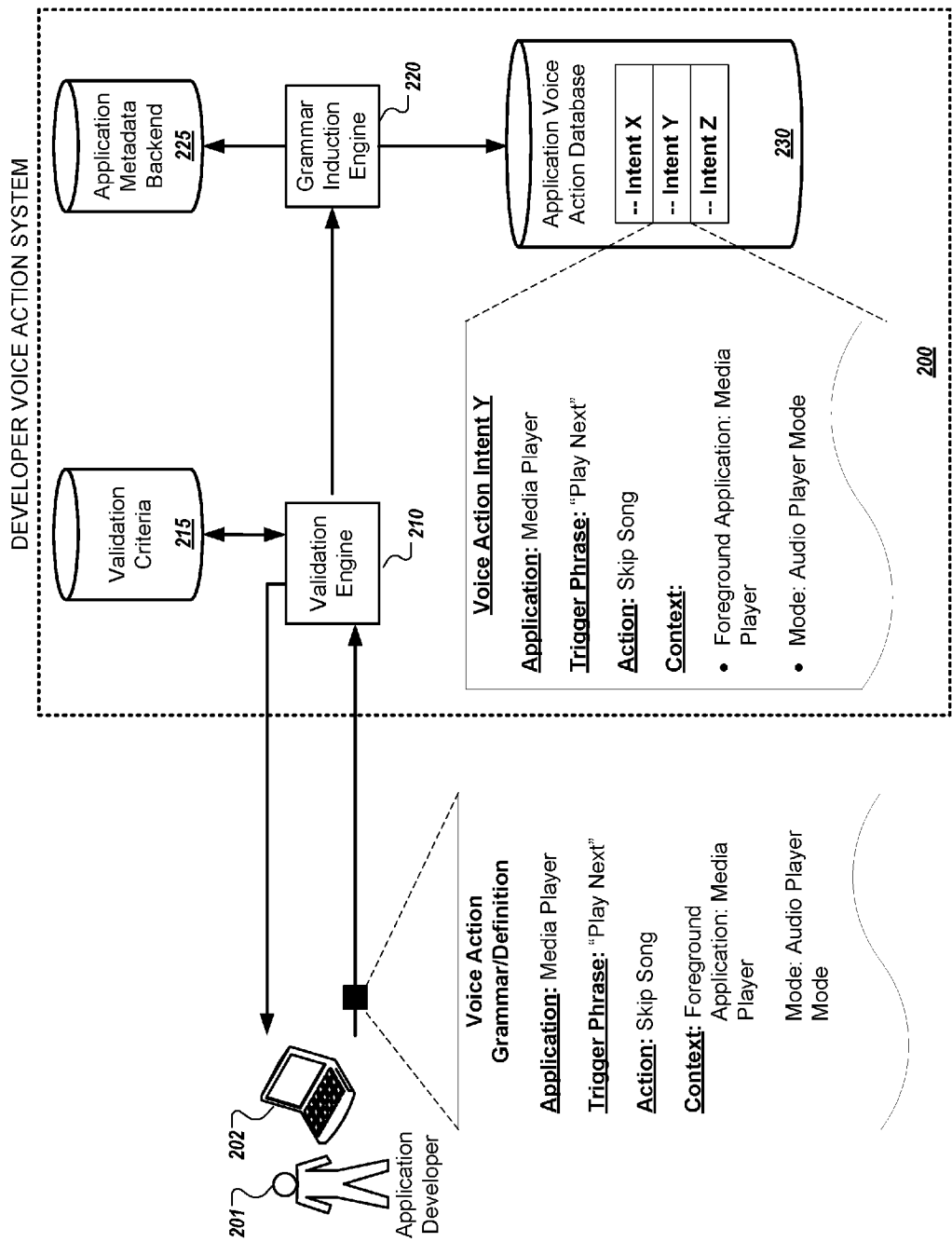
FIG. 2 depicts an example system for generating new voice actions using a voice action development system and service.

FIG. 2 illustrates an example system that enables an application developer to generate new voice actions for an application that is installed on one or more user devices. For example, after an application has been released and downloaded to one or more user devices, the application developer can define a new voice action using a voice action development service. The voice action development service can deploy the new voice action to enable the new voice action for the application without requiring modifications to the application itself.

Briefly, FIG. 2 depicts a developer voice action system 200 that provides voice action development services to an application developer 201 who is associated with a terminal 202. The terminal 202 may be in communication with the developer voice action system 200 over one or more wired or wireless network connections, such as a wired or wireless Internet connection, that enables the terminal 202 to exchange electronic communications with the developer voice action system 200. The developer voice action system 200 includes a validation engine 210 that is in communication with a validation criteria database 215. The developer voice action system 200 further includes a grammar induction engine 220 that is in communication with an application metadata backend 225 and an application voice action database 230. The application voice action database 230 may be similar to the application voice action database 110 of FIG. 1, and can store intents generated from grammars that are submitted by application developers to define new voice actions for applications or that are based on information submitted by application developers that defines new voice actions. In some implementations, the developer voice action system 200 providing the service for application developers to establish new voice actions can be a part of the voice action system 100 of FIG. 1. In some implementations, operations performed by components of the developer voice action system 200 can be performed by different components of the developer voice action system 200. The developer voice action system 200 may comprise of more, fewer, or different components to perform the operations described as being performed by the developer voice action system 200.

As shown in FIG. 2, the application developer 201 can submit information defining a new voice action to the developer voice action system 200 using the terminal 202. For example, the terminal 202 may include an application for a developer voice action service, or the terminal 202 may be able to access the developer voice action service remotely over a network connection, for example, by accessing the developer voice action service at a website over the Internet. In other implementations, the developer voice action service may be hosted by the developer voice action system 200 such that the terminal 202 can access the developer voice action service at the developer voice action system 200 over the network connection between the terminal 202 and developer voice action system 200.

To implement a new voice action for a particular application, the application developer 201 can submit a new grammar to the developer voice action system 200 that defines the new voice action, or can submit other information that defines the new voice action to the developer voice action system 200. In the example shown in FIG. 2, to implement a new voice action, the application developer 201 first defines a new voice action for a media player application that is already installed on one or more user devices. To do so, the application developer 201 submits a grammar that defines the new voice action for the media player application. The grammar submitted by the application developer 201 specifies an application, namely the media player application, a trigger phrase "play next" to be associated with the new voice action, an action to be performed in response to detecting the "play next" trigger phrase, namely to skip to a next song, and a context for when the new voice action is enabled, namely that the media player application must be operating in the foreground of a user device and that the media player application must be in an audio player mode.

The grammar submitted by the application developer 201 may be in a specific format that enables the application developer 201 to readily define the new voice action without having familiarity with a specific data format used by the developer voice action system 200 for voice action intents. In other implementations, the application developer 201 can submit other information that can be received by the validation engine 210 or another component of the developer voice action system 200 and translated to generate a grammar defining the new voice action. For example, the application developer 201 may be presented with a form that includes fields that the application developer 201 can complete to define a new voice action. The form may enable the application developer 201 to specify information about the new voice action, for example, an application, a trigger phrase for the new voice action, and an action or activity to be performed by or with respect to the application in response to the trigger phrase. The form can allow the application developer 201 to provide a context that requires a specific status of a user device or of one or more applications operating on the user device for the new voice action to be enabled, that is, for the voice action to be a candidate voice action that a user can trigger using the trigger phrase. Other information necessary or optionally used to define a new voice action may be entered at the form. The entries in the form fields provided by the application developer 201 may be converted to a grammar for submission to the developer voice action system 200, or the entries may be received by the developer voice action system 200 and converted to a grammar at the developer voice action system 200. Alternatively, the application developer 201 may define the new voice action by entering the necessary information using the grammar format that is submitted to the voice action developer system 200, or using another format, such as a delimiter-separated value (DSV) format.

In some implementations, a new voice action may be developed to perform one or more operations in a software application that operates on a user device, to perform one or more operations with respect to the user device generally (i.e., to control hardware of the user device), to control an application that is external to the user device (i.e., an application operating on a different device), or to control another device that is external to the user device. For example, the application developer 201 may provide a grammar defining a new voice action to control a specific application on a user device (e.g., a social network application or media player application), to control the user device (e.g., to change the orientation of a screen of the device or to power off the device), to control an application operating on a different device (e.g., to control cable television software operating on a cable television box that is external to the user device), or to control another device that is separate from the user device (e.g., to control a garage door using a voice input provided to the user device). In some implementations, a voice action can be defined such that triggering the voice action causes two or more different actions or activities to be performed at two or more different applications or devices.

A context specified by an application developer 201 identifies one or more conditions that must be satisfied for a voice action to be enabled, i.e., such that the voice action will not be triggered by a trigger phrase associated with the voice action unless the context is also satisfied. The application developer 201 can define a context as have one or more different requirements or conditions.

In some instances, a context submitted by an application developer 201 may specify a status or attributes of a user device, such as whether the user device is powered on or locked, whether the user device has a camera, gyroscope, barometer, or other component or feature. Thus, for example, a voice action to take a picture using an application installed on a user device may not be enabled if context information received from the user device indicates that the user device does not have a camera.

In other examples, a context may require that specific applications are operating in the foreground or background of a user device. For example, as shown in FIG. 2, the "play next" voice action may only be enabled when the media player application is operating in the foreground of user device 204, but not if the media player application is closed or is operating in the background of the user device 204. In other examples, a voice action may be defined with a context that enables the voice action when an application is operating in the background. For instance, a social network application may have an associated voice action to accept a request to connect with another user, and a user may be able to trigger the voice action to accept a request to connect with another user even if the social network application is only operating in the background of the user device.

A context may additionally or alternatively require that a particular application being operating in a specific mode for a voice action to be enabled. A mode may be a particular activity or task that the application is executing. For example, an email application may be determined to be in an email write mode, a media player application may be in an audio player mode, or a camera application may be in a camera mode or a photo album viewer mode. The user device may be able to determine which of the modes a particular application is operating in, and may include that information in context information that is used to determine whether a particular voice action is enabled.

Additionally, in some instances, a context may require that an application mode has a certain status. For example, a context may indicate that a voice action to "pause" a movie may only be enabled when a media player application is in a movie player mode and when the status of the application in the movie player mode is that the application is currently playing the movie. In some instances, a user device may not be able to determine the status of an application operating in a particular mode. In those instances, it may be necessary to configure the application to provide information indicating the status of the application in a particular mode. Thus, specifying such a condition in a context for a particular application may require modifications to the application itself, in order for context information provided by the user device to include the required status information.

In some examples, a context specified for a voice action may require that particular objects or types of objects are displayed on a screen of a user device to enable the voice action. For example, a context may specify that a "save image" voice action is only enabled if an image is being output at the display of the user device, or may specify that a "highlight" voice action is only available if text is presented on the display. In another example, a voice action to select a particular item in a list, such as the voice action to "pick the first one" may only be available if context information indicates that a number "1" or a bullet point is being presented on the display of the user device, or if there is a list of items being presented on the display. In some instances, the user device may not be capable of determining what information is being presented at its display at a given moment, e.g., when an application is in control of the display. Thus, if a context specifies that certain information or types of information must be output at the display for a voice action to be enabled, then it may be necessary to modify the application to provide that information. The user device can then include the information indicating what is being output at the display of the user device in context information that is used to determine whether a specific voice action should be enabled.

In other instances, a context may require that a notification or a particular type of notification has been output at a user device. For example, an email application that provides pop-up notifications to users when a new email is received may have an associated voice action to "read email" that is enabled when a new email notification is being output to the display of a user device by the application. Thus, context information may indicate whether a notification is being output to the display of the user device, and that information may be used in determining whether the "read email" voice action should be enabled.

In some examples, a context may require a user device be in a particular geographic location for a voice action to be enabled. A user device may be capable of determining its geographic location using cellular tower triangulation, based on accessing an internet connection that is associated with a particular geographic location, using Global Positioning System (GPS) technology, or using other means. The user device may include information indicating its geographic location in context information, and a voice action may be enabled based on the geographic location satisfying a context's geolocation requirements. As an example, a context associated with a voice action for a retailer's application may specify that a certain voice action should only be processed if a user device having the retailer application is within a range of one of the retailer's stores. The voice action for the retailer application may be enabled based on context information from the user device indicating that the geographic location of the user device corresponds to a geographic location that is within the range of one of the retailer's stores.

A context defined by an application developer can also indicate that a voice action associated with the context is only enabled during certain times, dates, months, seasons, or when other temporal conditions are met. For example, a context may specify that a certain voice action is only enabled if context information received from a user device or from another information source satisfies a time condition. For example, a voice action for a banking application may be associated with a context that includes a temporal condition, such that the voice action is only enabled if context information indicates that a time when the voice action is submitted is between 6:00 AM and 10:00 PM.

A context may specify other requirements for a voice action to be enabled. For example, the developer voice action system 200 may have access to information from sources other than a user device, or may be able to receive information from a user device that is obtained from one or more information sources. The information received from the other sources can be required context information for enabling a voice action. Such information can include, for example, weather information, emotional information for a user, news information, stock market information, or other information. For instance, the developer voice action system 200 may be capable of accessing other information sources through one or more wired or wireless network connections, e.g., an Internet connection or other network connection to a server system. A context for a voice action may specify that the voice action is enabled only if weather information for a geographic area corresponding to the location of a relevant user device indicates that it is raining in that location. To check whether the context condition is met, the developer voice action system 200 may be able to access weather information for a known location of a user device over the one or more network connections.

The grammar or other information defining the new voice action submitted by the application developer 201 can be submitted to the developer voice action system 200 from the terminal 202 over a network. The submitted grammar is received at the developer voice action system 200 by the validation engine 210. If the application developer 201 submits information to the developer voice action system 200 that defines the voice action but that is not in grammar format, the developer voice action system 200 may convert the information defining the new voice action to a grammar.

The validation engine 210 analyzes the grammar to determine whether the submitted grammar can be inducted into an intent for a new voice action. For example, the validation engine 210 may be able to determine whether a trigger phrase specified by the grammar is a valid trigger phrase, can determine whether the activity specified by the grammar can be performed by the specified application, can determine whether the format of the submitted grammar is syntactically valid, can determine if the context specified by the grammar is valid, or can otherwise determine whether the submitted grammar is a valid grammar that can be inducted to generate an intent for the new voice action. To perform the validation, the validation engine 210 may access a validation criteria database 215 that includes rules used to validate the grammar.

For example, the validation engine 210 receives the grammar that specifies the new voice action for the media player application. The grammar specifies the trigger phrase "play next," that the trigger phrase "play next" should cause the media player application to skip to a next song, and a context specifying that the new voice action should be enabled when the media player application is operating in the foreground and is an audio player mode. The validation engine 210 can access validation rules at the validation criteria database 215 and validate the received grammar based on the rules. For example, the validation engine 210 may determine whether the media player application is an existing application, such that new voice actions can be created for the specified application. The validation engine 210 may access a rule that specifies that a trigger phrase must be more than one spoken syllable in length, and may validate the trigger phrase "play next" based on determining that the trigger phrase "play next" is longer than one spoken syllable. The validation rules may specify a list of possible actions that the media player application can perform, and may validate the specified action to skip to a next song based on determining that skipping to a next song is an operation that the validation engine 210 is capable of performing. The validation engine 210 may validate the context specified by the grammar to ensure that the context does not contain contradictions. For example, the validation engine may ensure that the specified context does not require the application to be operating in the foreground and also operating in the background for the new voice action to be enabled, since only one of those two conditions can be satisfied. Other validation criteria may be applied to a received grammar to determine whether the grammar submitted by the application developer 201 is valid.

Other forms of validation may be performed by the validation engine 210. For instance, the validation engine 210 may determine whether the application developer 201 is authorized to generate new voice actions for the specified application, may determine whether a fee required to generate the new voice action has been paid, or may otherwise determine whether a grammar submitted by an application developer 201 may result in the creation of an intent for the new voice action.

Based on the outcome of the validation performed by the validation engine 210, feedback can be provided to the application developer 201 that indicates whether the grammar is valid. If the validation engine 210 determines that the grammar is invalid, the validation engine 210 may cause the terminal 202 to output information indicating that the grammar is invalid and requesting that the application developer 201 correct the grammar, or may suggest ways that the application developer 201 can correct the grammar. For instance, if a grammar is determined to be invalid because it specifies an action that cannot be performed by the specified application (e.g., if the grammar specified that the new voice action should cause the media player application to open a new email), then the validation engine 210 may cause information to be output at the terminal 202 that indicates that the grammar specifies an action that is incompatible with the specified application, and may indicate that the application developer 201 may correct the grammar by changing either the specified action or the specified application. If the submitted grammar is valid, the validation engine 210 may provide an indication that the submitted grammar is valid.

Additionally, the validation engine 210 may request additional input from the application developer 201. For example, if the grammar is determined to be valid, the validation engine 210 may present the application developer 201 with an option to continue with generating the new voice command, such that an intent for the new voice command will not be generated from the grammar unless the application developer 201 confirms that they would like to continue with generating the new voice command. This may enable an application developer 201 to determine if they are properly submitting grammars to the developer voice action system 200, without having to continue with the grammar induction or deployment of the new voice action.

Based on the grammar submitted by the application developer 201 being validated and, optionally, the application developer 201 providing input indicating that the voice action generation process should be continued, the grammar can be provided to the grammar induction engine 220 by the validation engine 210. The grammar induction engine 220 can induct the received grammar to generate an intent for the new voice action. The generated intent can specify information included in the grammar defining the new voice action. For example, the grammar induction engine 220 can induct a received grammar to generate an instance of an intent data structure that specifies one or more of the application, the trigger phrase, the action or activity to perform in response to detecting the trigger phrase, and the context specified for the new voice action. The grammar induction engine 220 can store the intent for the new voice action at the application voice action database 230.

For instance, as shown in FIG. 2, the grammar induction engine 220 can receive the grammar submitted by the application developer 201 that has been validated by the validation engine 210. The grammar induction engine 220 can generate a new intent, "Intent Y," for the new voice action based on the received grammar. To generate the intent, the grammar induction engine 220 may generate a new instance of an intent data structure and may populate the intent data structure with information included in the received grammar, including information specifying the media player application, information specifying the trigger phrase "play next," information specifying that the "play next" voice action should be associated with skipping to a next song in the media player application, and information specifying a context indicating that the "play next" voice action should be enabled when the media player application is operating in the foreground and is operating in an audio player mode.

The new "Intent Y" can be stored by the grammar induction engine 220 at the application voice action database 230 that includes other intents for other voice actions, such as "Intent X" and "Intent Z." Each of "Intext X" and "Intent Z" may be associated with other voice actions for other applications, or with other voice actions for the media player application. Once the new "Intent Y" has been stored at the application vice action database 230, the new voice action may be deployed such that the new voice action may be used by users having the media player application stored on their devices. That is, once deployed, users of the media player application may use the new "play next" voice action without having to update their applications.

In some implementations, inducting the grammar to generate the intent may also involve generating one or more alternate trigger terms that are based at least on the trigger term submitted by the application developer 201, and including the alternate trigger terms in the intent generated for the new voice action. For example, one or more expansion rules, synonym rules, optionalization rules, substitution rules, rewrite rules, or other rules may be applied to the trigger term submitted by the application developer 201 to determine alternate trigger terms. The grammar induction engine 220 may include the alternate trigger terms in the intent for the new voice action, such that detection of the trigger term submitted by the application developer 201 or of an alternate trigger term can result in triggering of the voice action.

Additionally, in some implementations, the grammar induction engine 220 may store information relating to a new intent separate from the intent data structure. For example, information specifying a context required for the new voice action to be enabled, or a trigger term associated with the new voice action, may be stored separately from the intent for the new voice action. In such instances, context information received from a user device or a trigger term received from the user device may be compared with the context and trigger term associated with the intent without having to access the data in the intent. The intent may be triggered based on determining that the received context information and/or trigger term match the respective context and/or trigger term associated with the intent. In this way, only information necessary for triggering the activity or action associated with the new voice action need be included in the intent, and other information used to select the intent for triggering, to identify the intent, or other information, may be stored externally from the intent. For example, the developer voice action system 200 may store a lookup table, linked list, or other data that maps a context or trigger term information to specific intents, such that the identification of a particular pairing of a context and trigger term may be cause the intent associated with that that pairing to trigger.

In some implementations, the developer voice action system 200 may also provide capabilities for the application developer 201 to test the new voice action before it is deployed for public use. For example, the developer voice action system 200 may provide capabilities for the application developer 201 to test the new voice action using their terminal 202 without the voice action being available to other users. The developer voice action system 200 may also provide capabilities for the application developer 201 to specify one or more user devices for which the new voice action should be enabled for testing. For example, the application developer 201 may specify that the new voice action should be deployed for a beta test group of known user devices, to ensure proper operation of the new voice action prior to deploying the new voice action for general public use.

In some implementations, the developer voice action system 200 may enable testing of the new voice action by changing a setting associated with the intent, such that the intent can be identified and trigger based on receiving a voice command from one of the user devices specified for testing. For example, the developer voice action system 200 may store a setting for each of the intents stored in the application voice action database 230, where the setting indicates whether an intent for a particular voice action has been deployed generally for public use, or may identify specific user devices to which the intent has been deployed for testing purposes. After storing an intent at the application voice action database 230, the developer voice action system 200 may receive information from the terminal 202 indicating that the intent should be enabled for a specific set of one or more user devices for testing purposes. In response, the setting for the intent may be updated to deploy the intent to the specified set of user devices such that the voice action associated with the intent may be triggered. Once enabled for testing, a voice input received from a user device in the set may cause the intent to be triggered, thereby allowing for testing of the voice action.

In other embodiments, the developer voice action system 200 may enable testing of the new voice action prior to the intent for the new voice action being stored in the application voice action database 230. For example, the application developer 201 may indicate that they would like to test the new voice action before deploying it, and may indicate a number of user devices or user accounts for which the new voice action should be temporarily enabled for testing. After generating the intent for the new voice action, the developer voice action system 200 may enable the voice action for the specified user devices or user accounts, such that a specified user device or a user device associated with a specified user account can trigger the new voice action if a user of provides the trigger phrase associated with the new voice action as input to one of the user devices.

In still other implementations, the developer voice action system 200 can provide testing capabilities for new voice actions before the grammar for the new voice action is inducted by the grammar induction engine 220. For example, after validating the received grammar, the validation engine 210 or another component of the developer voice action system 200 may be capable of simulating the operation of the new voice action defined by the grammar to enable the application developer 201 or users of other devices to test the new voice action. In some instances, simulating the new voice action may require the terminal 202 or other user devices used for testing to utilize a simulator or testing mode provided by the developer voice action system 200 to simulate operation of the new voice action. Providing testing capabilities before the new grammar is inducted can allow for faster iterative testing of new voice actions by the application developer 201, thereby speeding up the overall voice action development process.

Capabilities to deploy voice actions and to rescind the deployment of voice actions can also be provided by the developer voice action system 200. For example, after a grammar defining a new voice action has been submitted to the developer voice action system 200 by the application developer 201, validated, inducted to generate a new intent, and the new intent has been stored at the application voice action database 230, the developer voice action system 200 may request whether the application developer 201 would like to deploy the new voice action. The application developer 201 may elect to deploy the new voice action, where deploying the new voice action enables triggering of the new voice action at user devices of the general public that have the application associated with the new voice action installed. The application developer 201 can provide input at the terminal 202 to deploy the new voice action. The new voice action can then be deployed such that the new voice action is capable of being triggered on other user devices that have the application associated with the new voice action installed. That is, after the new voice action has been deployed, input of the trigger phrase for the new voice action at a user device having the application installed will cause the intent associated with the new voice action to trigger. Triggering of the intent associated with the new voice action causes the intent or other action trigger data to be transmitted to the user device, such that data in the intent or the action trigger data causes the actions or activities of the voice action to be performed by the user device. As discussed, deploying the intent may only require the developer voice action system 200 to update a setting associated with the intent of the new voice action to make the intent a candidate intent to be triggered in response to a voice input.

After a voice action has been deployed, the application developer 201 may rescind the deployment of the new voice action, such that the new voice action can no longer be triggered at user devices that have the application associated with the new voice action installed. For example, the application developer 201 may provide input to the developer voice action system 200 identifying the voice action and indicating that their intention to rescind deployment of the voice action. In response, the developer voice action system 200 may rescind the deployment of the voice action, for example, by updating a setting associated with the intent for the voice action such that the intent for the voice action cannot be triggered. Since the deployment or clawing back of a voice action only requires the developer voice action system 200 to update information stored at the developer voice action system 200, without changing the application installed on users' devices, the application developer 201 may readily deploy or rescind deployment of voice actions.

In some implementations, the developer voice action system 200 can also generate discoverability examples for a new voice action. A discoverability example can include information that can be presented to a user of a user device that informs the user that particular voice actions are available, possibly including new voice actions that were submitted by a developer after the application was installed. In some instances, the discoverability example can be output in response to the user device having a status that matches a context associated with the voice action, or in response to a user asking what voice actions might be available.

For example, based on receiving a grammar defining a new voice action, the grammar induction engine 220 or another component of the developer voice action system 200 can generate discoverability examples for the voice action defined by the grammar, and can store the discoverability examples in the application metadata backend 225. The discoverability examples can be provided to user devices that have the application associated with the new voice action installed. For example, the metadata of the application may be periodically updated to include a current list of discoverability examples for the application that are stored in the application metadata backend 225. Alternatively, based on a user device submitting context information that indicates its current status, information may be transmitted to the user device that causes discoverability examples for voice actions enabled for the status of the user device to be output at the user device.

For example, in addition to generating the new "Intent Y" for the "play next" voice action, the developer voice action system 200 may generate one or more discoverability examples for the "play next" voice action. The discoverability examples may include information that is output at user devices that have the media player application. The discoverability example can be output at a user device based on the context associated with the "play next" voice action being met, or based on other conditions. For example, the discoverability example for the "play next" voice action can be a message "Try saying 'play next'" that is output whenever the media player application is operating in the foreground of a user device and is in audio player mode. In some implementations, a discoverability example may be output in response to other events or conditions. For example, the discoverability example message "Try saying 'play next'" may be output in response to a user of the user device providing an input to the user device by pressing a button or control, or by saying "what voice actions can I say?"

In general, discoverability examples for application voice actions may be provided to users without requiring action by the applications themselves. For example, the developer voice action system 200 may provide data including discoverability examples to a user device, and the user device may cause the discoverability examples to be output without applications related to the discoverability examples being required to perform operations. In some implementations, an OS operating on a user device may capable of receiving discoverability examples or of accessing application metadata that specifies discoverability examples, and of causing the discoverability examples to be output at the user device. Thus, discoverability examples for voice actions related to a particular application may be provided for output without modifications to the particular application.

In some implementations, discoverability examples for application voice actions can be output in such a way that a user would understand that the discoverability examples are not being provided by the application itself. For example, a user device can provide discoverability examples in such a way that it is apparent that the discoverability examples are being provided by the developer voice action system 200 or an OS, and not the specific applications related to the voice actions. For instance, a user device may use a specific computerized voice tone recognizable as being associated with the user device's OS when providing discoverability examples. Alternatively, discoverability examples may be output in such a way that it is clear that the application is not providing the discoverability examples. For instance, a discoverability example may be output that says, "Try saying 'play next' or 'pause' and I will have the media player application handle your request," to distinguish the role of the OS from actions performed by the media player application itself. Other ways of indicating that discoverability examples are being provided by a separate system or application may also be implemented.

Figure 3:
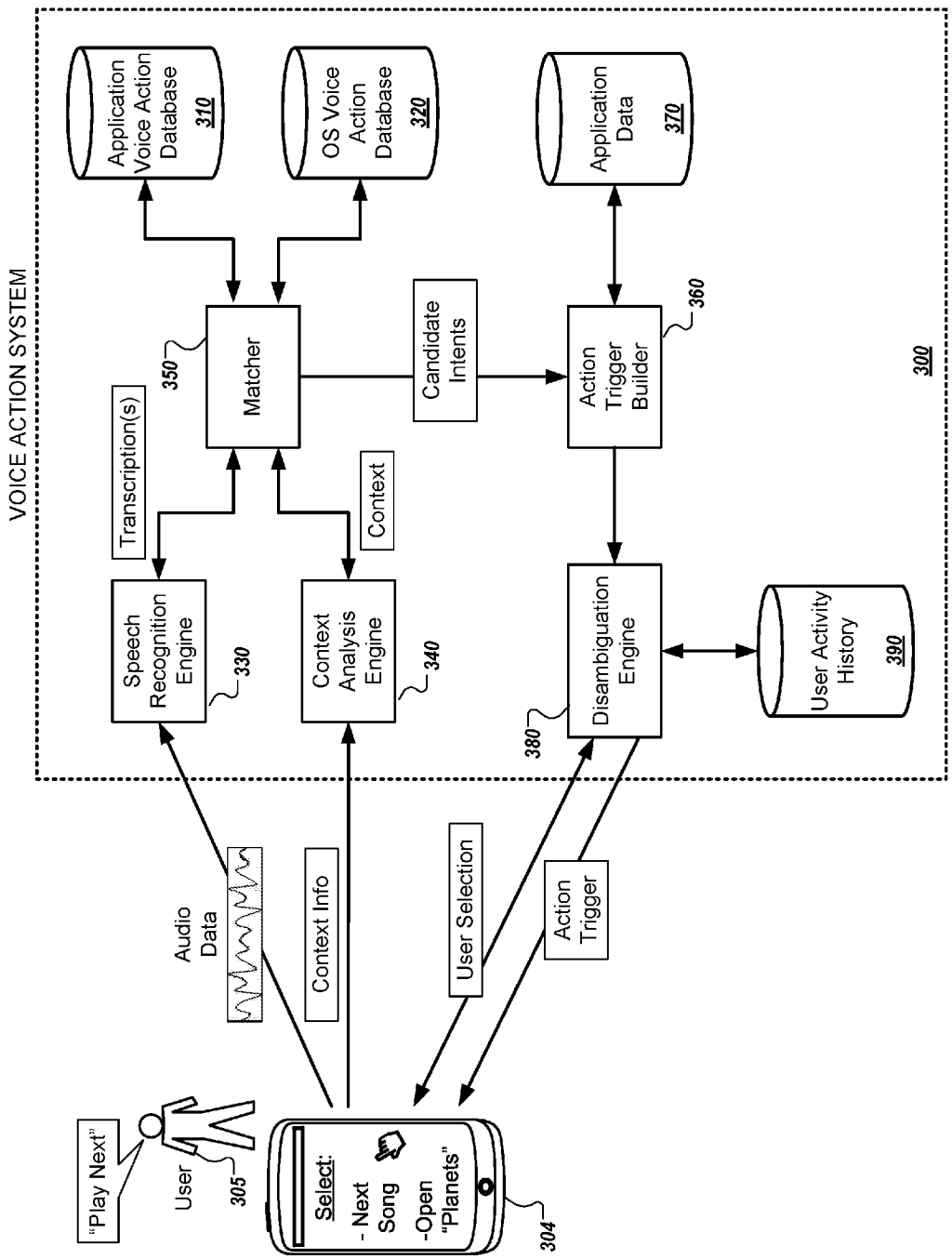
FIG. 3 depicts an example system for using voice actions.

FIG. 3 illustrates an example voice action system 300 for processing voice actions received from a user of a user device. In some implementations, the voice actions processed by the voice action system 300 may be voice actions that an application developer has created for an application after the application was downloaded to the user device. The voice action created by the application developer may have been created for the application using the developer voice action system 200 of FIG. 2.

Briefly, the voice action system 300 is in communication with a user device 304 belonging to a user 305 over one or more wired or wireless networks, such as one or more wired or wireless Internet or cellular data connections that enable the user device 304 to exchange electronic communications with the voice action system 300. The voice action system 300 includes a speech recognition engine 330 and a context analysis engine 340 that process information received from the user device 304 over the one or more network connections. The voice action system includes a matcher 350 that is in communication with the speech recognition engine 330 and the context analysis engine 340, and that also has access to an application voice action database 310 and an OS voice action database 320. The matcher 350 communicates with an action trigger builder 360 that has access to an application data database 370. A disambiguation engine 380 that has access to a user activity history 390 can also send or receive electronic communications from the user device 304 over the one or more network connections.

To process a voice input submitted by the user 305, audio data corresponding to the voice input and context information indicating a status of the user device 304 and/or applications operating on the user device 304 are provided to the voice action system 300. In some instances, the user device 304 may obtain the voice input in response to the user 305 selecting a control that causes the user device 304 to begin recording user speech, in response to the user 305 speaking a phrase whose detection causes the user device 304 to obtain subsequent voice input from the user 305, or may otherwise determine to record the voice input of the user 305. A requirement to provide specific input to trigger the recording of user speech can prevent the user device 304 from needlessly processing user speech, i.e., by reducing the amount of audio data that must be processed, or from recording so much user speech as to infringe on the privacy of the user 305, i.e., by only recording specific speech that the user 305 is directing to the user device 304.

In the example shown in FIG. 3, for instance, the user 305 may select a control on the user device 304 to cause the user device 304 to begin recording voice input of the user 305, and after the user 305 has selected the control, the user 305 may provide a voice input by saying "play next." The user device 304 may transmit the audio data corresponding to the voice input to the voice action system 300 over one or more networks. Additionally, the user device 304 may determine context information for the user device 304 or applications operating on the user device 304, and context information for the user device 304 may be transmitted to the voice action system 300 over the one or more networks.

In some instances, the context information transmitted from the user device 304 to the voice action system 300 includes specific information that is identified by information stored at the user device 304. For example, the user device 304 can store information that indicates specific status information to transmit to the voice action system 300 as context information. The context information provided to the voice action system 300 by the user device 304 may include a standardized body of context information, such that all user devices submit the same context information to the voice action system 300, or the context information provided by the user device 304 may be a specific set of context information designated for the user device 304. In some implementations, the voice action system 300 may request certain context information from the user device 304, and the context information transmitted by the user device may be information provided to the voice action system 300 in response to the request. In still other instances, information associated with applications installed on the user device 304, such as application metadata, may specify context information to provide to the voice action system 300, and the user device 304 may transmit context information to the voice action system 300 that includes the information specified by the application information.

For example, in the example shown in FIG. 3, the context information transmitted from the user device 304 to the voice action system 300 may include information indicating that a media player application is currently operating in the foreground of the user device 304, that the media player application is operating in an audio player mode, and that the current battery life of the user device 304 is 50%.

The audio data transmitted by the user device 304 may be received by the speech recognition engine 330 of the voice action system 300, and the speech recognition engine 330 may generate a transcription of the voice audio data. For example, as discussed with respect to the speech recognition engine 130 of FIG. 1, the speech recognition engine 330 may be capable of receiving the audio data and generating a transcription of the audio data corresponding to the voice input of the user 305. After generating the transcription of the audio data, the speech recognition engine 330 can provide the transcription to the matcher 350.

In some implementations, in addition to receiving the audio data, the speech recognition engine 330 may also receive context information provided to the voice action system 300 by the user device 304. The speech recognition system 330 may bias speech recognition based on the received context information. In some implementations, biasing speech recognition based on context information may include adjusting probabilities that certain words are detected in audio data. For instance, the speech recognition system 330 may adjust probabilities that certain words are detected based on their relevance to a context indicated by the contextual information.

As an example, the speech recognition engine 330 may receive audio data corresponding to the utterance "play next" as well as context information indicating that a media player application is currently running in the foreground of the user device 304. The speech recognition engine 330 may bias speech recognition based on the context information such that the speech recognition engine 330 generates the transcription "play next" instead of the transcription "planets," based on the speech recognition engine 330 increasing a probability that the word "play" or the phrase "play next" is detected in audio data, or decreasing a probability of the word "planets" being detected, based on determining that those words have relevance or a lack of relevance to the media player application that is running in the foreground of user device 304.

The context analysis engine 340 of the voice action system receives the context information transmitted by the user device 304 and processes the context information to determine a context of the user device 304 or applications operating on the user device 304. Similar to the context analysis engine 140 of FIG. 1, the context analysis engine 340 of the voice action system 300 can process received context information to determine portions of the received context information that are relevant to identifying a voice action to trigger, or can process the received context information to determine if there is other context information that is needed from the user device 304 to identify a voice action to trigger. If additional context information is needed to determine a voice action to perform, the context analysis engine 340 can request the additional context information from the user device 304, such that the user device 304 can respond to the request with the additional context information. In some implementations, the context analysis engine 340 can modify the format of the received context information to generate a context that can be used by the voice action system 300 in identifying a voice action to trigger. The context analysis engine 340 provides processed context information to the matcher 350.

In the example shown in FIG. 3, for instance, the context analysis engine 340 receives the context information from the user device 304. The received context information may indicate that a media player application is running in the foreground of the user device 304, that the media player application is operating in an audio player mode, and that the battery life of the user device 304 is 50%. The context analysis engine 340 may determine that the battery life information is not relevant to determining which voice action to trigger in response to the voice input of the user 305, and so the context analysis engine 340 may provide a context to the matcher 350 that indicates only that the media player application is operating in the foreground of the user device 304 and is in an audio player mode.

The matcher 350 receives the context from the context analysis engine 340 and the transcription from the speech recognition engine 330, and uses the received context and transcription to identify one or more candidate voice actions to trigger. For example, the matcher 350 may match the context received from the context analysis engine 340 against the contexts associated with one or more intents that are included in the application voice action database 310 and/or the OS voice action database 320. Based on determining that the received context matches contexts associated with one or more of the intents, the matcher 350 may identify those intents as candidate intents for triggering. After identifying candidate intents based on matching the received context against the contexts associated with the candidate intents, the matcher 350 may narrow the set of candidate intents by comparing the received transcription against trigger phrases associated with the candidate intents. The matcher 350 may provide information identifying the narrowed set of candidate intents to the action trigger builder 360.

In some instances, the matcher 350 may receive multiple candidate transcriptions of a voice input, and may identify a narrowed set of candidate intents based on determining that each of the candidate intents is associated with a context that matches the context received from the context analysis engine 340 and one or more of the candidate transcriptions of the voice input received from the speech recognition engine 330. For example, the speech recognition engine 330 may determine multiple candidate transcriptions for the voice input, and may provide information indicating each of the candidate transcriptions to the matcher 350. The matcher 350 may then identify a narrowed set of candidate intents that each specify a context that is compatible with the context received by the matcher 350 that also specify a trigger phrase that matches a candidate transcription of the voice input.

In the example shown in FIG. 3, the matcher 350 receives a context indicating that the user device 304 has the media player operating in the foreground and in the audio player mode. The matcher 350 also receives two transcriptions of the audio data, namely the transcriptions "play next" and "planets." The matcher 350 identifies candidate intents to fire based on this information by comparing the received context and transcriptions to the context and trigger phrases associated with intents stored at the application voice action database 310 and OS voice action database 320. Based on the comparison, the matcher 350 identifies two candidate intents, including an intent for a "play next" voice action that causes the media player application to skip to a next song, and an intent for a "planets" voice action that causes an application called "Planets" to open. The matcher 350 can provide information to the action trigger builder 360 that identifies the two candidate intents, or the matcher 350 can provide a copy of the candidate intents to the action trigger builder 360.

The action trigger builder 360 receives information that indicates one or more candidate intents to fire in response to the voice input and context information received from the user device 304. The action trigger builder 360 generates action triggers for one or more particular intents, where each action trigger comprises data that is capable of controlling the user device 304 to perform the voice action associated with the corresponding intent. In some implementations, the action trigger builder 360 generates an action trigger for each candidate intent identified by the matcher 350. In other implementations, the action trigger builder 360 may obtain an indication of a particular intent to trigger from among the candidate intents, and may generate an action trigger only for the particular intent. In either implementation, the action trigger builder 360 may generate an action trigger based on the information received from the matcher 350 and information accessed at the application data database 370.

For example, the action trigger builder 360 may receive an intent for a candidate voice action, and the action trigger builder 360 can access information at the application data database 370 that can cause the candidate voice action to be performed at the user device 304. For example, the information accessed at the application data database 370 can include information for performing or triggering the activity or actions associated with a voice action, such as information about the user device 304, information about the application associated with the voice action, or information about an operating system running on the user device 304. The action trigger builder 360 can use the accessed information as an action trigger for the candidate voice action, or can used the accessed information to generate action trigger data that is capable of triggering the actions or activities associated with the candidate voice action at the user device 304. In some implementations, the voice action system 300 may not include the action trigger builder 360 or the application data database 370, such that an intent itself may be transmitted to the user device 304 and information in the intent can cause the user device 304 to perform the action or activity associated with the intent.

In the example shown in FIG. 3, the action trigger builder 360 may receive an intent for the "play next" voice action for the media player application and an intent for the "planets" voice action for opening the "Planets" application. The action trigger builder 360 may generate action triggers for each of the "play next" and "Planets" voice actions. To generate an action trigger for the "play next" voice action, the action trigger builder 360 accesses information at the application data database 370 that pertains to the media player application installed on the user device 304, may access information that pertains to the user device 304 or a specific model of the user device 304, or may access information that pertains to an operating system that is running on the user device 304. The action trigger builder 360 uses the received intent and the information accessed at the application data database 370 to generate an action trigger for the "play next" voice action. Similarly, the action trigger builder 360 may generate an action trigger for the "planets" voice action by accessing information relating to the "Planets" application, the user device 304, or an operating system running on the user device 304, and may generate an action trigger for the "planets" voice action based on the received and accessed information.

As discussed above, in some examples the matcher 350 may identify more than one candidate intents to trigger, and in those instances it may be necessary to select a particular intent to trigger from among the set of candidates. The disambiguation engine 380 can perform operations to select or receive user input selecting from among the candidate intents. For example, the disambiguation engine can output a request to the user device 304 that asks the user 304 to select a particular voice action from among the candidate voice action associated with the candidate intents. In response to the request, the user 305 can provide input to the user device 304 to select a particular candidate voice action to perform. Information indicating the user selection can be received by the disambiguation engine 380.

Alternatively, the disambiguation engine 380 can have access to a user activity history 390 that includes information about previous voice actions submitted to the user device 304 or other actions performed at the user device 304. For example, the user activity history 390 can indicate a number of times that the user 305 has triggered a particular candidate voice action, the number of times the user 305 has performed specific actions at the user device 304 with or without using a voice action, or can include other information about the usage of the user device 304 by the user 305. In some instances, the user activity history 390 can include information that indicates the usage history of users other than the user 305. For example, the user activity history 390 can include information that indicates usage patterns of all users who have the media player application and/or the "Planets" application installed on a user device.

In some implementations, the information in the user activity history 390 can be used by the voice action system 300 to select from among candidate intents without requesting input from the user 305. For example, the disambiguation engine 380 may access information at the user activity history 390 that indicates that the user 305 has previously selected a particular candidate voice action when providing a similar voice input, and based on that information, the disambiguation engine 380 may select a particular candidate intent to trigger without requesting input from the user 305. Similarly, the disambiguation engine 380 may determine that a certain ratio or number of users who have provided a voice input similar to the voice input received from the user 305 have elected to trigger a particular voice action, and the disambiguation engine 380 may select a particular candidate voice intent to trigger based on that information and without requesting input from the user 305. In some implementations, each of the candidate intents may have an associated score that indicates a strength of relationship between a particular trigger phrase and the particular candidate intent. A particular candidate intent may be selected based on the scores assigned to the candidate intents that indicates the strength of the relationship between the candidate intent and a received trigger phrase.

Other factors may be considered or included in the user activity history 390 that is used in selecting a candidate intent. For example, the voice action system 300 may track behavior at the user device 304 after the voice action system triggers a certain candidate intent, to determine whether the triggered intent appears to match the expectation of the user 305. For example, if the user 305 takes operations to perform another action at the user device 304 after the voice action system 300 triggers a certain voice action, that may indicate that the voice action system 300 triggered the wrong candidate intent, and so the voice action system 300 may add information to the user activity history 390 indicating that the received voice input should not trigger or should be less likely to trigger the triggered intent. In other examples, the user activity history 390 may include information that indicates how frequently the user 305 or other users select a particular candidate intent for a given status of their user device, e.g., for a particular status indicated in the context information provided to the voice action system 300. Other information included in the user activity history 390 can be accessed by the disambiguation engine 380 and used to select a particular candidate intent from a set of candidate intents.

For the example shown in FIG. 3, based on determining that the candidate intents for the voice input provided by the user 305 include the intent for the "play next" voice action for the media player application or the intent for the "planets" voice action for opening the "Planets application," the disambiguation engine 380 can provide information to the user device 305 that requests a user selection of a particular candidate voice action. As shown, a request can be output at a display of the user device 304 that requests the user 305 select either a "Next Song" voice action, or a voice action to "Open 'Planets'." The user 305 provides an input at the user device 304 to select the "Next Song" option. Data indicating the user selection is transmitted to the disambiguation engine 380, and in receiving data indicating the user selection, the disambiguation engine 380 determines to trigger the intent for the "play next" voice action. In some examples, the disambiguation engine 380 may also store information at the user activity history 390 indicating that the user 305 has elected to trigger the intent for the "play next" voice action over the intent for the "planets" voice action. The disambiguation engine 380 may rely on the information stored at the user activity history 390 to automatically determine a candidate voice action to trigger if a similar voice input is later received by the voice action system 300 from the user device 304.

In an alternative implementation of the example shown in FIG. 3, the disambiguation engine 380 may select a particular candidate intent to trigger based on accessing the user activity history 390. For example, the user activity history 390 may indicate that the user 305 of the user device 304 has previously provided a similar voice input and elected to trigger the intent for the "next song" voice action. Based on the user activity history 390 indicating that the intent for the "play next" voice action was previously triggered after receiving the similar voice input, the disambiguation engine 380 may determine to trigger the intent for the "play next" voice action without requesting additional input from the user 305.

After a particular candidate intent has been selected, and, if necessary, an action trigger for the selected candidate voice action has been generated, the voice action system 300 transmits information to the user device 304 that causes the selected voice action to be performed. For example, the disambiguation engine 380 or another component of the voice action system 300 can transmit the intent or action trigger data for the selected voice action to the user device 304 to cause the user device 304 to perform the selected voice action.

In the example shown in FIG. 3, for instance, after the user 305 has selected the "next song" option to select the "play next" voice action that causes the media player application to skip to a next song, and after an action trigger has been generated that includes data for controlling the media player application to skip to a next song, the disambiguation engine 380 can transmit the action trigger to the user device 304. The user device 304 can receive the action trigger, and the action trigger can cause the user device 304 to perform the "play next" voice action by causing the media player application to skip to a next song.

In some implementations, a notification indicating a triggered voice action may be provided for output at the user device 304. For example, the voice action system 300 or an OS of the user device 304 may cause a notification to be output at the user device 304 that identifies the voice action that has been triggered. In some instances, the notification identifying the triggered voice action may be provided in such a way that it is apparent to the user 305 that the application associated with the triggered voice action is not responsible for detecting the voice action or triggering the voice action. For example, a notification provided at the user device 304 may use a voice tone that is recognizable as being associated with the voice action system 300, the user device 304, or an OS of the user device 304, and not the media player application operating on the user device 304. In another example, a notification may be presented in a way that distinguishes the system or application handling the voice input from the user 305 from the application that is performing the triggered voice action. For example, a notification may state, "You have triggered the 'play next' voice action. I will now have the media player application skip to a next song," thereby indicating to the user 305 that the media player application was not responsible for processing the voice input.

Figure 4:
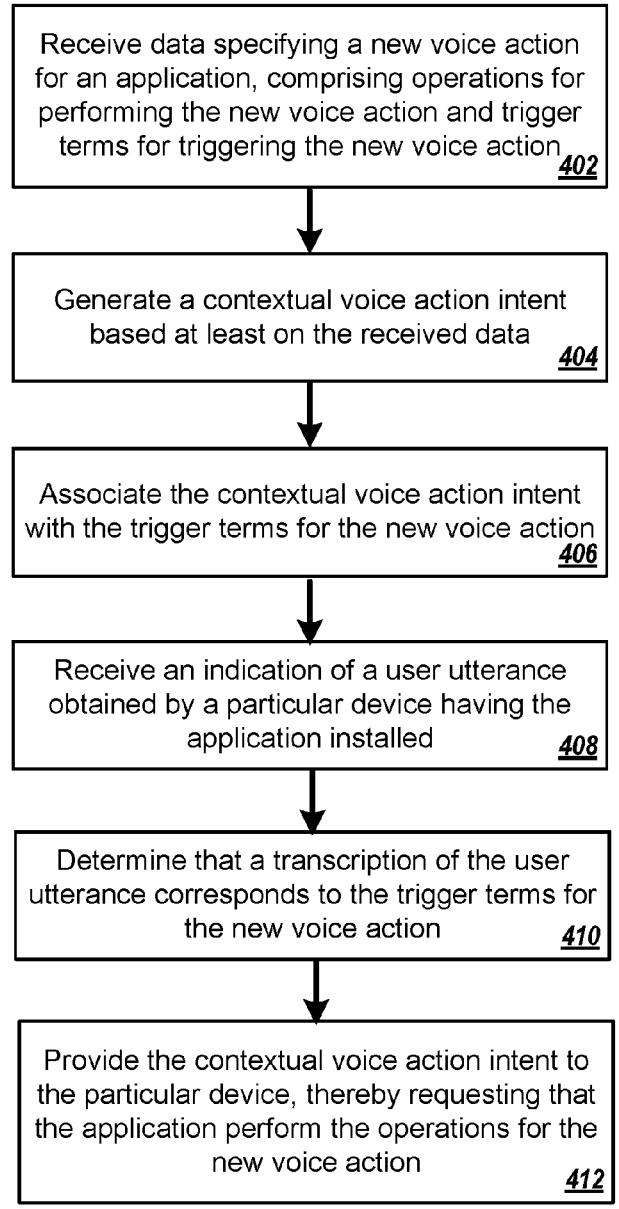
FIG. 4 is a flowchart of an example process associated with a voice action development system and service.

FIG. 4 depicts a flow chart for an example process 400 performed by a voice action system. In some examples, the process 400 of FIG. 4 can be performed by the voice action system 100 of FIG. 1, or by components of the voice action system 100 of FIG. 1. The process 400 describes a process by which an application developer can establish a new voice action for an application that has been installed on one or more user devices, and by which a user of a user device having the application installed can trigger the new voice action to cause operations associated with the new voice action to be performed by the application on the user device.

Initially, data is received by a voice action system that specifies a new voice action for a software application that is different from the voice action system, wherein the data comprises one or more operations for performing the new voice action and one or more trigger terms for triggering the new voice action (402). For example, an application developer 101a-101n associated with the software application can submit data defining a new voice action to the voice action system 100 using a terminal 102a-102n.

The data defining the new voice action can include data specifying one or more operations for performing the new voice action and one or more trigger terms for triggering the new voice action. For example, data defining a new voice action may specify the trigger term "play next" and may specify that the new voice action should perform operations to cause a media player application to skip to a next song. The data may also specify additional information related to the new voice action, such as the application that the new voice action pertains to, a context when the new voice action should be enabled for use by a user, or other information. For example, the data defining the "play next" voice action may also specify that the voice action pertains to the media player application, and may specify that the voice action should be enabled when the media player application is operating in the foreground and is in an audio player mode.

A contextual voice action intent for the software application is generated by the voice action system based at least on the received data, wherein the contextual voice action intent comprises data that, when received by the software application, requests that the software application perform the one or more operations of the new voice action (404). For example, the voice action system 100 of FIG. 1 may receive the data specifying the new voice action, and may generate a contextual voice action intent for the new voice action based on the received data. The voice action system 100 may store the contextual voice action intent in the application voice action database 110. In some implementations, the voice action system 100 may generate the intent using a process similar to that described with respect to FIG. 2, by validating the received data and inducting the received grammar to generate the contextual voice action intent. In some implementations, the generated contextual voice action intent can store information that can control the software application to perform the one or more operations for performing the new voice action.

The contextual voice action intent is associated with the one or more trigger terms for the new voice action by the voice action system (406). For example, after the contextual voice action intent for the new voice action has been created by the voice action system 100, the voice action system 100 can associate the contextual voice action intent for the new voice action with the one or more trigger terms specified in the received data. The contextual voice action intent having the associated one or more trigger terms can be stored at the application voice action database 110. In some implementations, associating the one or more trigger terms with the contextual voice action intent can involve specifying the one or more trigger terms in the contextual voice action intent. In other implementations the association may be effected by otherwise linking the one or more trigger terms with the contextual voice action intent, such that receipt of one of the one or more trigger terms results in identification of the contextual voice action intent.

The voice action system is configured to receive an indication of a user utterance obtained by a device having the software application installed (408). For example, the voice action system 100 may be configured to receive an indication that an utterance has been received from the user device 104, where the utterance is obtained by the user device 104 as a voice input from the user 105. The user device 104 can have the software application associated with the new voice already installed, for example, the media player application discussed with respect to FIG. 1.

The voice action system is configured to determine that a transcription of the user utterance corresponds to the one or more trigger terms associated with the contextual voice action intent (410). For example, the voice action system 100 may be configured to receive audio data corresponding to the user utterance, and can generate a transcription of the user utterance using the speech recognition engine 130 of the voice action system 100. The transcription of the user utterance generated by the speech recognition engine 130 can be compared with trigger terms associated with multiple contextual voice action intents, including the contextual voice action intent for the new voice action and contextual voice action intents for other voice actions.

In some instances, the comparison may be performed by the voice action selector 150 of FIG. 1, where the voice action selector 150 can compare the transcription of the user utterance against trigger terms for contextual voice action intents stored at the application voice action database 110 or the OS voice action database 130. Based on the comparison, the voice action selector 150 may determine that the transcription of the user utterance matches one or more of the one or more trigger terms associated with the contextual voice action intent of the new voice action. For example, the speech recognition engine 130 may generate a transcription for the user utterance received from the user device 104 that reads "play next." The voice action selector 150 may compare the "play next" voice action against trigger terms associated with candidate contextual voice action intents to determine that the transcription matches the trigger phrase "play next" associated with the contextual voice action intent for the new "play next" voice action.

The voice action system is configured to provide the contextual voice action intent to the particular device, thereby requesting that the software application installed on the particular device perform the one or more operations of the new voice action (412). For example, in response to determining that the transcription of the user utterance generated by the speech recognition engine 130 of the voice action system 100 matches the one or more trigger terms associated with the contextual voice action intent for the new voice action, the voice action selector 150 can provide the contextual voice action intent for the new voice action to the user device 104. The contextual voice action intent for the new voice action can effectively request that the software application installed on the user device 104 perform the one or more operations of the new voice action. For example, the contextual voice action intent may include data that triggers the one or more operations associated with the new voice action upon the user device 104 receiving the contextual voice action intent.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

For instances in which the systems and/or methods discussed here may collect personal information about users, or may make use of personal information, the users may be provided with an opportunity to control whether programs or features collect personal information, e.g., information about a user's social network, social actions or activities, profession, preferences, or current location, or to control whether and/or how the system and/or methods can perform operations more relevant to the user. In addition, certain data may be anonymized in one or more ways before it is stored or used, so that personally identifiable information is removed. For example, a user's identity may be anonymized so that no personally identifiable information can be determined for the user, or a user's geographic location may be generalized where location information is obtained, such as to a city, ZIP code, or state level, so that a particular location of a user cannot be determined. Thus, the user may have control over how information is collected about him or her and used.

While the foregoing embodiments have been predominantly described with reference to the development of voice actions for use with applications installed on user devices, the described features may also be used with respect to machines, other devices, robots, or other systems. For example, the voice action system 100 of FIG. 1 may be utilized to develop and implement voice actions for interacting with machinery, where the machinery has an associated computing system, may be used to develop and implement voice actions for interacting with a robot or system having robotic components, may be used to develop and implement voice actions for interacting with appliances, entertainment systems, or other devices, or may be used to develop and implement voice actions for interacting with a vehicle or other transportation system.

Embodiments and all of the functional operations described in this specification may be implemented in digital electronic circuitry, or in computer software, firmware, or hardware, including the structures disclosed in this specification and their structural equivalents, or in combinations of one or more of them. Embodiments may be implemented as one or more computer program products, i.e., one or more modules of computer program instructions encoded on a computer readable medium for execution by, or to control the operation of, data processing apparatus. The computer readable medium may be a machine-readable storage device, a machine-readable storage substrate, a memory device, a composition of matter effecting a machine-readable propagated signal, or a combination of one or more of them. The term "data processing apparatus" encompasses all apparatus, devices, and machines for processing data, including by way of example a programmable processor, a computer, or multiple processors or computers. The apparatus may include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal that is generated to encode information for transmission to suitable receiver apparatus.

A computer program (also known as a program, software, software application, script, or code) may be written in any form of programming language, including compiled or interpreted languages, and it may be deployed in any form, including as a stand alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both.

The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer may be embedded in another device, e.g., a tablet computer, a mobile telephone, a personal digital assistant (PDA), a mobile audio player, a Global Positioning System (GPS) receiver, to name just a few. Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in, special purpose logic circuitry.

To provide for interaction with a user, embodiments may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input.

Embodiments may be implemented in a computing system that includes a back end component, e.g., as a data server, or that includes a middleware component, e.g., an application server, or that includes a front end component, e.g., a client computer having a graphical user interface or a Web browser through which a user may interact with an implementation, or any combination of one or more such back end, middleware, or front end components. The components of the system may be interconnected by any form or medium of digital data communication, e.g., a communication network. Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

Thus, particular embodiments have been described. Other embodiments are within the scope of the following claims. For example, the actions recited in the claims may be performed in a different order and still achieve desirable results.

What is claimed is:

1. A computer-implemented method comprising:
    receiving, by a voice action system, data defining a new voice action that does not currently exist for a software application installed on one or more devices, the software application being different from said voice action system, the data indicating one or more operations for the software application to perform the new voice action and one or more trigger terms for triggering the new voice action, wherein the data defining the new voice action specifies a context, the context specifying a status of a user device or of the software application installed on the user device;
    generating, by the voice action system, a voice action passive data structure based at least on the data defining the new voice action, wherein the voice action passive data structure comprises data that, when received by the software application, causes the software application to perform the one or more operations to perform the new voice action;
    associating, by the voice action system, the voice action passive data structure with the context and with the one or more trigger terms for triggering the new voice action, wherein multiple voice action passive data structures are defined in the voice action system;
    receiving, by the voice action system, (i) user command utterance obtained by the user device, the user device having the software application installed, and (ii) current context information regarding the user device;
    identifying, using the current context information and not a transcription of the user command utterance, a set of candidate voice action passive data structures from the multiple voice action passive data structures of the voice action system, the set of candidate voice action passive data structures including the voice action passive data structure defined by the data and being identified based on respective contexts associated with the set of candidate voice action passive data structures;
    narrowing the identified set of candidate voice action passive data structures by comparing the transcription of the user command utterance with trigger terms of respective ones of the set of candidate voice action passive data structures;
    determining, by the voice action system, that the transcription of the user command utterance corresponds to the one or more trigger terms associated with the voice action passive data structure; and
    in response to the determination, providing, by the voice action system, the voice action passive data structure to the user device which is remote from the voice action system, thereby causing the software application installed on the user device to perform the one or more operations to perform the new voice action.

2. The computer-implemented method of claim 1, wherein the new voice action is a voice-enabled command that the software application is not programmed to support.

3. The computer-implemented method of claim 1, wherein receiving the data defining the new voice action comprises receiving the data from a developer who published the software application.

4. The computer-implemented method of claim 1, wherein the voice action system does not receive the data defining the new voice action from the software application installed on the user device.

5. The computer-implemented method of claim 1, wherein the context specifies that a specific activity that the software application is performing is in a particular activity state.

6. The computer-implemented method of claim 1, comprising:
    determining, by the voice action system, that the context information satisfies the context; and
    wherein in response to determining that the transcription of the user command utterance corresponds to the one or more trigger terms associated with the voice action passive data structure and that the context information satisfies the context, the voice action system provides the voice action passive data structure to the user device.

7. The computer-implemented method of claim 6, wherein receiving the current context information indicating the status of the user device or of the software application installed on the user device comprises:
    providing, by the voice action system to the user device, a request for particular context information; and
    receiving, by the voice action system, the particular current context information in response to the request.

8. The computer-implemented method of claim 6, comprising:
    determining, by the voice action system, that the current context information satisfies a context for a second voice action, and that the transcription of the user command utterance corresponds to one or more trigger terms associated with a voice action passive data structure for the second voice action, wherein the voice action passive data structure for the second voice action comprises data that, when received by a software application associated with the second voice action, causes the software application associated with the second voice action to perform one or more operations to perform the second voice action;
    in response to the determination, selecting, by the voice action system, a voice action from among the new voice action and the second voice action; and
    providing, by the voice action system, the voice action passive data structure associated with the selected voice action to the user device, thereby causing the software application installed on the user device to perform the one or more operations to perform the selected voice action.

9. The computer-implemented method of claim 8, wherein selecting the selected voice action from among the new voice action and the second voice action comprises selecting the selected voice action in response to receiving data indicating a user selection of one of the new voice action or the second voice action.

10. The computer-implemented method of claim 8, wherein selecting the selected voice action from among the new voice action and the second voice action comprises:
    assigning a score to each of the new voice action and the second voice action; and selecting the selected voice action based at least on the score assigned to each of the new voice action and the second voice action.

11. The computer-implemented method of claim 8, wherein selecting the selected voice action from among the new voice action and the second voice action comprises selecting the selected voice action in response to determining that the software application associated with the selected voice action is operating in the foreground.

12. The computer-implemented method of claim 1, wherein generating the voice action passive data structure comprises determining that the one or more operations to perform the new voice action are capable of being performed by the software application.

13. The computer-implemented method of claim 1, comprising:
 determining, by the voice action system, that the transcription of the user command utterance is similar to the one or more trigger terms associated with the voice action passive data structure;
 in response to the determination, providing, by the voice action system to the user device, data indicating a request for user input that confirms whether the user command utterance corresponds to the one or more trigger terms associated with the voice action passive data structure or was intended to cause the software application to perform the new voice action;
 in response to the request, receiving, by the voice action system and from the user device, data indicating a confirmation; and
 in response to receiving the data indicating the confirmation, providing, by the voice action system, the voice action passive data structure to the user device, thereby causing the software application installed on the user device to perform the one or more operations to perform the new voice action.

14. The computer-implemented method of claim 1, comprising:
 receiving, by the voice action system, a request to deploy the new voice action; and
 deploying, by the voice action system, the new voice action in response to the request, wherein deploying the new voice action enables triggering of the new voice action.

15. The computer-implemented method of claim 1, comprising:
 receiving, by the voice action system, a request to rescind deployment of the new voice action; and
 rescinding, by the voice action system, deployment of the new voice action in response to the request, wherein rescinding deployment of the new voice action disables triggering of the new voice action.

16. The computer-implemented method of claim 1, comprising:
 receiving, by the voice action system, a request to enable testing of the new voice action, wherein the request specifies one or more devices for which the new voice action should be enabled; and
 enabling, by the voice action system, triggering of the new voice action for the one or more specified devices in response to the request, wherein triggering of the new voice action is disabled for devices that are not included in the specified devices.

17. The method of claim 1, further comprising determining, based on the data, whether the new voice action is valid for the software application, and based on the determination that the new voice action is valid for the software application, inducting the new voice action to generate the voice action passive data structure.

18. The method of claim 1, wherein the multiple voice action passive data structures include built-in voice actions that were submitted by at least a first application developer when the software application was built, and other voice actions that were submitted by at least a second application developer after the software application was built.

19. The method of claim 18, wherein the multiple voice action passive data structures further include application-specific voice actions that are supported by default by an operating system on one or more of the devices.

20. A system comprising:
 one or more computers and one or more storage devices storing instructions that are operable, when executed by the one or more computers, to cause the one or more computers to perform operations comprising:
 receiving, by a voice action system, data defining a new voice action that does not currently exist for a software application installed on one or more devices, the software application being different from said voice action system, the data indicating one or more operations for the software application to perform the new voice action and one or more trigger terms for triggering the new voice action, wherein the data defining the new voice action specifies a context, the context specifying a status of a user device or of the software application installed on the user device;
 generating, by the voice action system, a voice action passive data structure based at least on the data defining the new voice action, wherein the voice action passive data structure comprises data that, when received by the software application, causes the software application to perform the one or more operations to perform the new voice action;
 associating, by the voice action system, the voice action passive data structure with the context and with the one or more trigger terms for triggering the new voice action, wherein multiple voice action passive data structures are defined in the voice action system;
 receiving, by the voice action system, (i) user command utterance obtained by the user device, the user device having the software application installed, and (ii) current context information regarding the user device;
 identifying, using the current context information and not a transcription of the user command utterance, a set of candidate voice action passive data structures from the multiple voice action passive data structures of the voice action system, the set of candidate voice action passive data structures including the voice action passive data structure defined by the data and being identified based on respective contexts associated with the set of candidate voice action passive data structures;
 narrowing the identified set of candidate voice action passive data structures by comparing the transcription of the user command utterance with trigger terms of respective ones of the set of candidate voice action passive data structures;
 determining, by the voice action system, that the transcription of the user command utterance corresponds to the one or more trigger terms associated with the voice action passive data structure; and in response to the determination, providing, by the voice action system, the voice action passive data structure to the user device which is remote from the voice action system, thereby causing the software application installed on the user device to perform the one or more operations to perform the new voice action.

21. A non-transitory computer-readable storage device storing software comprising instructions executable by one or more computers which, upon such execution, cause the one or more computers to perform operations comprising:

receiving, by a voice action system, data defining a new voice action that does not currently exist for a software application installed on one or more devices, the software application being different from said voice action system, the data indicating one or more operations for the software application to perform the new voice action and one or more trigger terms for triggering the new voice action, wherein the data defining the new voice action specifies a context, the context specifying a status of a user device or of the software application installed on the user device;

generating, by the voice action system, a voice action passive data structure based at least on the data defining the new voice action, wherein the voice action passive data structure comprises data that, when received by the software application, causes the software application to perform the one or more operations to perform the new voice action;

associating, by the voice action system, the voice action passive data structure with the context and with the one or more trigger terms for triggering the new voice action, wherein multiple voice action passive data structures are defined in the voice action system;

receiving, by the voice action system, (i) user command utterance obtained by the user device, the user device having the software application installed, and (ii) current context information regarding the user device;

identifying, using the current context information and not a transcription of the user command utterance, a set of candidate voice action passive data structures from the multiple voice action passive data structures of the voice action system, the set of candidate voice action passive data structures including the voice action passive data structure defined by the data and being identified based on respective contexts associated with the set of candidate voice action passive data structures;

narrowing the identified set of candidate voice action passive data structures by comparing the transcription of the user command utterance with trigger terms of respective ones of the set of candidate voice action passive data structures;

determining, by the voice action system, that the transcription of the user command utterance corresponds to the one or more trigger terms associated with the voice action passive data structure; and in response to the determination, providing, by the voice action system, the voice action passive data structure to the user device which is remote from the voice action system, thereby causing the software application installed on the user device to perform the one or more operations to perform the new voice action.

* * * * *

UNITED STATES PATENT AND TRADEMARK OFFICE
CERTIFICATE OF CORRECTION

PATENT NO. : 9,922,648 B2  
APPLICATION NO. : 15/057453  
DATED : March 20, 2018  
INVENTOR(S) : Wang et al.

Page 1 of 1

It is certified that error appears in the above-identified patent and that said Letters Patent is hereby corrected as shown below:

In the Claims

In Column 31, Line 37, Claim 1, delete "(i) user" and insert -- (i) a user --, therefor.

In Column 33, Line 65, Claim 17, delete "The method of claim 1," and insert -- The computer-implemented method of claim 1, --, therefor.

In Column 34, Line 4, Claim 18, delete "The method of claim 1," and insert -- The computer-implemented method of claim 1, --, therefor.

In Column 34, Line 10, Claim 19, delete "The method of claim 18," and insert -- The computer-implemented method of claim 18, --, therefor.

In Column 34, Line 44, Claim 20, delete "(i) user" and insert -- (i) a user --, therefor.

In Column 36, Line 3, Claim 21, delete "(i) user" and insert -- (i) a user --, therefor.

Signed and Sealed this  
Twenty-seventh Day of November, 2018

Andrei Iancu  
*Director of the United States Patent and Trademark Office*